(12) United States Patent
Balduin et al.

(10) Patent No.: US 7,302,813 B2
(45) Date of Patent: Dec. 4, 2007

(54) METHOD AND DEVICE FOR BENDING GLASS PANES IN PAIRS

(75) Inventors: Michaël Balduin, Alsdorf (DE); Michaël Labrot, Aachen (DE); Hubert Havenith, Wurselen (DE)

(73) Assignee: Saint-Gobain Glass France, Courbevoie (FR)

( * ) Notice: Subject to any disclaimer, the term of this patent is extended or adjusted under 35 U.S.C. 154(b) by 645 days.

(21) Appl. No.: 10/467,078

(22) PCT Filed: Feb. 6, 2002

(86) PCT No.: PCT/FR02/00455

§ 371 (c)(1),
(2), (4) Date: Jan. 20, 2004

(87) PCT Pub. No.: WO02/064519

PCT Pub. Date: Aug. 22, 2002

(65) Prior Publication Data

US 2004/0129028 A1    Jul. 8, 2004

(30) Foreign Application Priority Data

Feb. 6, 2001    (DE) ................... 101 05 200

(51) Int. Cl.
*C03B 23/035*    (2006.01)
(52) U.S. Cl. ............... 65/106; 65/107; 65/273; 65/287; 65/289
(58) Field of Classification Search .......... 65/106, 65/287, 273, 289, 107, 290; 72/369
See application file for complete search history.

(56) References Cited

U.S. PATENT DOCUMENTS 2,377,849 A * 6/1945 Binkert et al. ............... 65/103

(Continued)

FOREIGN PATENT DOCUMENTS

DE    2 119 699    11/1971

(Continued)

OTHER PUBLICATIONS

U.S. Appl. No. 10/550,692, filed Sep. 27, 2005, Ollfisch et al.

*Primary Examiner*—Carlos Lopez
(74) *Attorney, Agent, or Firm*—Oblon, Spivak, McClelland, Maier & Neustadt, P.C.

(57) ABSTRACT

In a method for bending, in pairs, panes placed one upon the other, heated to their softening temperature, the pair or panes is deposited on a bending frame and prebent under action of the force of gravity. The prebent pair of panes is transferred onto a suction bending mold with a concave forming face, the underside of the lowermost pane being supported at least on the peripheral edge of the forming face. By applying a depression for a predetermined length of time, the air is sucked out of the intermediate space between the underside of the lowermost pane and the suction bending mold, and the pair of panes is pressed by atmospheric pressure onto the concave forming face of the suction bending mold. After the end of the application of the depression, the finished molded pair of panes is transferred from the suction bending mold onto a transport device and is cooled.

16 Claims, 2 Drawing Sheets

U.S. PATENT DOCUMENTS

| | | | |
|---|---|---|---|
| 2,550,252 A * | 4/1951 | Jendrisak | 65/374.14 |
| 2,570,309 A | 10/1951 | Black et al. | |
| 3,778,244 A | 12/1973 | Nedelec et al. | |
| 4,199,342 A * | 4/1980 | Mestre et al. | 65/106 |
| 4,233,050 A * | 11/1980 | Comperatore et al. | 65/107 |
| 4,711,653 A | 12/1987 | Frank et al. | |
| 4,859,225 A | 8/1989 | Kuster et al. | |
| 4,871,385 A | 10/1989 | Lecourt et al. | |
| 4,894,080 A | 1/1990 | Reese et al. | |
| 5,004,491 A | 4/1991 | McMaster et al. | |
| 5,009,694 A | 4/1991 | Nishitani et al. | |
| 5,071,461 A * | 12/1991 | Hirotsu et al. | 65/104 |
| 5,167,689 A | 12/1992 | Weber | |
| 5,324,373 A * | 6/1994 | Gillner et al. | 156/99 |
| 5,660,609 A | 8/1997 | Muller et al. | |
| 5,713,976 A | 2/1998 | Kuster et al. | |
| 5,893,941 A | 4/1999 | Nikander | |
| 5,974,836 A | 11/1999 | Radermacher et al. | |
| 5,992,178 A | 11/1999 | Kuster | |
| 2004/0129028 A1 | 7/2004 | Balduin et al. | |

FOREIGN PATENT DOCUMENTS

| | | |
|---|---|---|
| DE | 43 37 559 C1 | 3/1995 |
| DE | 197 25 189 C1 | 11/1998 |
| DE | 10257972 B3 * | 6/2004 |
| EP | 0 363 097 | 4/1990 |
| EP | 0 531 152 | 3/1993 |
| EP | 0 448 447 B1 | 1/1995 |
| EP | 0 705 798 B1 | 3/2000 |
| JP | 57 145041 | 9/1982 |
| WO | 91/17961 | 11/1991 |
| WO | 98/39261 | 9/1998 |

* cited by examiner

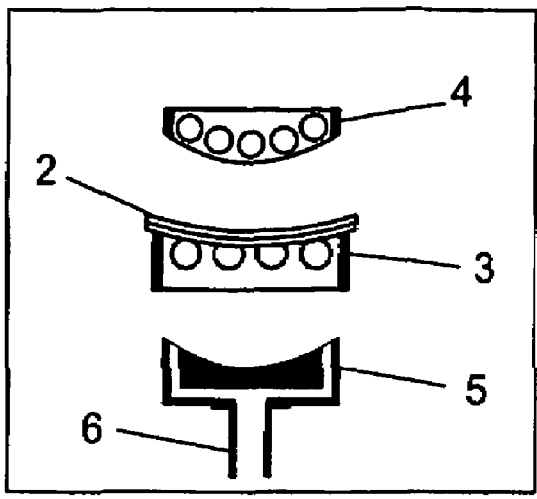
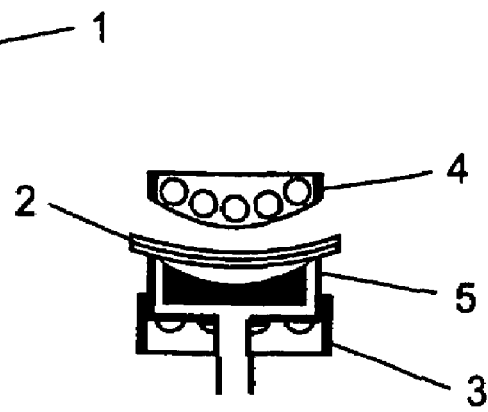
Fig. 1    Fig. 2
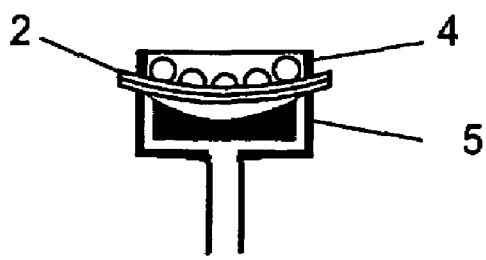
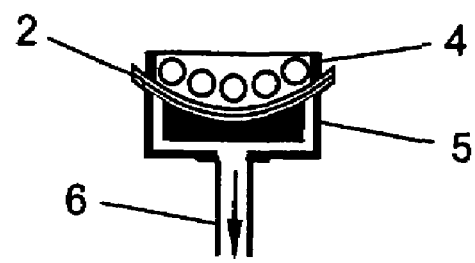
Fig. 3    Fig. 4
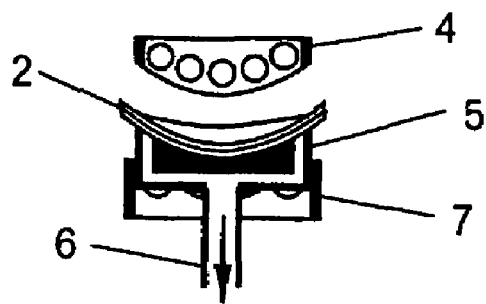
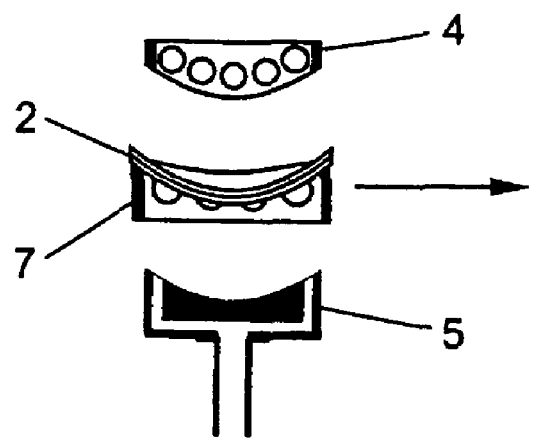
Fig. 5    Fig. 6

METHOD AND DEVICE FOR BENDING GLASS PANES IN PAIRS

BACKGROUND OF THE INVENTION

1. Field of the Invention

The invention relates to a method for bending panes in pairs, in which method the pair of panes is prebent in a horizontal position on a bending frame under the effect of the force of gravity and is then bent using a full bending mold acting on the prebent pair of panes. It also relates to a particularly appropriate device for implementing this method. Panes bent in pairs are then mainly, although not exclusively, fashioned into laminated glass windshields for vehicles.

2. Discussion of the Background

Document DE-C1-43 37 559 describes a relevant method, in which the prebent pairs of panes on a bending frame are applied from below to a solid upper bending mold. The latter is then surrounded at its edge by a skirt, which forms an annular slot with the exterior edge of the upper bending mold. Once the heated panes have been applied to the upper bending mold by means of the bending frame, air is sucked out at high speed through said annular slot. As a result, the two panes are applied by their entire surface to the upper bending mold. Together they acquire their definitive spherical configuration. The flow of air through the annular slot is also supposed to make any air inclusions between the two panes disappear.

Document EP-A2-0 531 152 discloses another relevant method. Thus, after they have been prebent in pairs on the bending frame, the panes are lifted off the latter and transferred together onto a lower press-bending mold. During bending, the panes are also bent into their definitive shapes by mechanical pressing on a solid upper mold. Such a method may lead to optical defects on the faces of the panes, because the pressing forces have necessarily to be transmitted from one pane to the other.

Document EP-B1-0 705 798 discloses a method for bending, on a frame, one or more panes superposed in pairs under the effect of the force of gravity, in which method the pane(s) deposited on a rigid prebending frame adapt, under the effect of the force of gravity, to the profile of this bending frame. In a subsequent second bending step, the panes to be bent are transferred from the external prebending frame to a moving final bending frame, situated on the inside, which can be operated purely mechanically.

The known methods are not free of disadvantages. If, for final bending, use is simply made of a bending frame by way of a lower bending mold, then it is not possible to prevent the panes from retaining, in the central region inside the edge region, a more pronounced deflection caused by the bending due to the force of gravity during the prebending phase. If, in order to avoid this disadvantage, a solid bending mold is used by way of a press-bending lower mold, then optical deformations may appear in the panes, these being due to the fact that the initial contact in the region of greatest deflection leads to deformations over a small area which cannot be completely eliminated even during the subsequent pressing operation. Furthermore, the known methods of this nature, working with mechanical presses, are, as a general rule, hampered by high build costs.

DE-A1-21 19 699 discloses a suction bending mold with a concave forming face. A suction bending mold is to be understood as meaning a device, for example in the form of a chamber, the forming face or side of which is formed by a bending contour with a solid surface. This forming face—concave in this instance—is usually provided with a number of holes, in a way known per se. Inside the chamber there are ducts and hollow spaces communicating with the holes. These may be connected, by associated suction pipes, to a vacuum generator or to a reservoir under vacuum. Operable valves in the pipes allow said ducts and hollow spaces to be placed suddenly under vacuum. In consequence, the air is sucked through the holes from the outer face of the suction bending mold giving rise, at points, to very large pressure differences and flow rates. According to the aforementioned document, a pane prebent on a solid upper suction bending mold is allowed to drop onto the concave lower suction bending mold. Its edges are the first to come into contact with the lower mold. The pane sinks down onto it, on the one hand, under the effect of the force of gravity, but, on the other hand, is also pressed against the forming face by the pressure difference between atmospheric pressure and the depression created in the lower mold.

This method is admittedly recommended for the simultaneous bending of two or more panes, even for high curvatures, but the transfer of a pair of panes from the convex upper mold to the concave lower mold is not, however, described. Furthermore, in this method, the two main faces of the panes necessarily come into contact with the faces of the molds.

Document U.S. Pat. No. 4,894,080 describes another method for bending pairs of panes which are prebent under the effect of the force of gravity on a prebending mold in the form of a frame, possibly produced in divided and movable form. A solid bending mold with a concave forming face is raised from beneath by the prebending mold in the form of a frame, after the latter has been positioned, and takes up the pair of panes. Using another bending mold in the form of a box, with a frame-shaped forming face, the edge of the pair of panes is pressed against the concave forming face, while inside the box, a raised pressure is created, under the effect of which raised pressure the pair of panes is pressed flat against the concave forming face. After a certain length of time, the raised pressure is raised again. The pair of panes is once again placed on the prebending mold in the form of a frame and, in place thereon, is removed from the bending station so that it can be cooled.

EP-B1-0 530 211 describes a device for bending individual panes, which device comprises a solid concave lower (suction) bending mold, onto which panes heated to the softening temperature are deposited. An upper bending frame with a complementary convex surface is then lowered onto the edge of the pane, to press the edges thereof onto the edge of the lower bending mold. Finally, the air between the lower bending mold and the pane is sucked out by applying pulses of vacuum to the forming chamber, the load applied to the edge by the bending frame ensuring sealing against the outside. The pane is brought into contact over its entire surface with the lower bending mold and thus acquires its definitive spherical curved configuration. In the last document cited, there is no question of bending panes in pairs.

According to another known method (DE-C1-197 25 189) for bending panes with the transfer of individual panes between different suction bending and prebending molds and a transfer device makes use of a bending frame split into segments. These segments can be parted from one another to allow the passage from a conveyor of a solid convex (suction) bending mold intended to receive the pane which has not yet been bent. Once the pane has been lifted up off the conveyor using the bending mold, the segments are once again brought together into a closed forming frame which, by way of a lower press-bending mold, presses the edges of the pane against the solid mold.

One advantage of concave suction concave molds is that the pane is bent in the face of the pane by suction without mechanical contact with the mold. As a result of this, imprints of the fabric of the mold into the surface of the glass are, to a large extent, avoided. This has a positive influence on the optical properties (transmission).

Finally, document EP-B1-448 447 discloses a method for bending individual panes or several panes simultaneously, in which method the (lowermost) pane is first of all placed along a first peripheral line on a first preforming mold in the form of a frame, and sinks down into a prebending contour—transverse bending—under the effect of the force of gravity. Next, the lowermost pane is held along a second peripheral bending line, which takes the place of the first peripheral line, to create the final bending contour—longitudinal bending. For this, a second bending mold in the form of a frame is placed in place of the prebending mold, the latter, depending on the embodiment, coming into contact only with a partial periphery of the surface of the glass. In this case too, the panes are bent merely under the effect of the force of gravity, the transfer from the prebending mold to the second bending mold taking place relatively swiftly. The two peripheral lines along which the face of the supported lowermost pane comes into contact with the two bending molds acting in turn, are different, because the support faces acting in turn are nested one inside the other, or respectively run parallel to one another in perpendicular projection.

SUMMARY OF THE INVENTION

The purpose of the invention is to indicate an additional method for bending panes in pairs, and a device suitable for implementing it.

According to the invention, this objective is achieved by the characteristics of claim 1 as regards the method. The characteristics of claim 9 indicate a corresponding device. The characteristics of the secondary claims respectively dependent on the independent claims disclose advantageous improvements to these objects.

Trapped between two panes prebent in pairs on a frame by the force of gravity are, as a general rule, at the most minimum volumes of air for minimum marginal slots. The method according to the invention now puts to use the effect whereby, in the event of a rapid reduction in the pressure, even only between the underside of the lowermost pane and the forming face of a concave suction bending mold, the air can, at the very most, get slowly in between the two panes.

Surprisingly, a pressure difference produced swiftly enough between said underside and the top face of the second pane simply placed freely on top is enough to press the two panes at the same time onto the forming face. Naturally, the force of gravity in any event assists with this direction of movement. In any event, mechanical action on the face of the uppermost pane is not necessarily needed.

It is advantageous in this instance for the separation face of the two panes to be, in a way known per se, covered beforehand with a separation means. This then avoids mutual damage to the two softened faces of the panes, which damage could arise as a result of inevitable relative movement during the common forming operation.

With this method, the panes acquire a high shape precision, comparable with that of the conventional press-bending methods, both in the region of the edges and in the central zone. Likewise, optical deformations are practically avoided across the entire surface. By using a solid concave mold according to the invention, the glass is stretched out at the middle of the pane, whereas during bending on convex molds, bending is performed from the middle, which may lead to upsetting and wrinkling at the edges of the panes.

In the event of particularly strict deformation requirements, particularly for the manufacture of complex window shapes with spherical curvature and in the case of significant prebending, the adaptation of the underside of the pane to the peripheral edge of the concave suction bending mold simply under the action of the force of gravity will not be enough firstly to seal against the outside the space between the underside of the pane and the bending face. Furthermore, under these edge conditions, slots may appear between the edges of the two panes placed one upon the other. Air could enter such slots when just the face of the lowermost pane is subjected to a depression during the bending operation and, respectively, the main bending step which follows.

Under such difficult conditions, it may prove necessary to mechanically press, in a way known per se, the edges of the two panes onto the edge of the concave suction bending mold. Furthermore, the space to be placed at a depression is thus sealed sufficiently against the outside. What is more, the edges of the two panes are pressed reliably one against the other so that air cannot get in between them during the bending operation. For this, the top face of the uppermost pane is placed in contact with an upper mold, either by lowering the upper mold onto the surface of the glass or by raising the concave lower mold. By way of upper mold, use will preferably be made of a bending frame that complements the edge of the lower mold, so as to confine the mechanical action on the top face of the pane to as small an area as possible. Inevitable optical defects at the edge of the pane may be concealed under the opaque colored strip usually provided on windshields.

As a preference, the mechanical seal will be left in action for only a very short space of time, while the pressure difference between the forming face, that is to say the underside of the pair of panes on the one hand, and its top face, on the other, is maintained for a longer period of time, so as to be sure of achieving the desired (complex) shape of pane. In this way, surface defects due to the mechanical contact are reduced to a large extent on the uppermost pane.

In this alternative form, the mechanical loading of the lowermost pane on its (visible) face through the upper pane is also avoided completely however.

Tests have already shown that this method could be implemented at lower temperatures than comparable methods. This leads to the advantages that even coated panes can be bent, without having to carry systems of heat-resistant layers at the limit of their temperature tolerances. It is known that such large-sized panes are essentially provided with systems of layers reflecting infrared radiation but which are, however, highly transparent from the optical point of view, so as to significantly reduce the radiation of heat into the cabin of vehicles. Admittedly, numerous systems of layers are already able to withstand temperatures ranging up to 650° C., but nonetheless any reduction in the maximum temperature that has to be withstood during the bending of the coated panes reduces the risk of damage to the coating.

The pair of panes may, in theory, be transferred from the prebending frame to the solid concave suction bending frame by a separate transfer device. It is also possible to use said forming frame itself as a transport means, to set the panes down on the solid lower mold. If the solid mold is a little smaller than the faces of the panes, then the transfer can be performed directly in a relative movement between the forming frame and the solid mold. In this case, the solid mold passes through the forming frame, which supports the panes only along their outer edge, and comes into contact with the underside of the lowermost pane. The edge thereof protrudes slightly beyond the contour of the forming face. Here too the prebending frame can be split into segments in the way already mentioned, if necessary in an appropriate variation, to optimize the transfer from the prebending mold to the suction bending mold.

Given that the uppermost pane rests entirely flat on the lowermost pane, such may in theory be cut, all the way around or along certain edges, to a size a little smaller than the lowermost pane. In the case of significant curvatures, this has the advantage that this more significantly curved interior pane does not protrude beyond the edge of the exterior pane, even after bending, as is the case of panes of exactly equal sizes. This then gives a finished laminated pane with a relatively cleaner outer edge.

It is advantageous to provide a transport device that corresponds as precisely as possible to the shape of the panes, for transferring the finished bent pair of panes from the solid concave mold to the cooling station. The prebending frame does not, as a general rule, lend itself to this because the shape of the finished bent panes differs appreciably from the simply prebent shape. In a preferred embodiment, this transport device also has the form of a frame, and is arranged practically in a coaxial position both with respect to the prebending frame and with respect to the solid concave mold. The space saving that can be achieved (the entire bending station is thus very compact) may at most entail the moving parts on the prebending frame and/or the transport frame for the finished panes. Thus, the transport device may also, as necessary, be subdivided into segments, once again in a way known per se, to allow optimum use of the space. In performing the bending method in its strictest sense, these steps are, however, of secondary importance.

In a particularly advantageous alternative form of the method, the prebent pair of panes is first of all transferred from the prebending frame onto another bending mold in the form of a frame, the support faces of which already have the contour of the bent panes in the finished state. However, this additional bending mold has essentially also to be considered as a prebending mold because the final shaping of the panes takes place at their face on the concave suction bending mold. Transfer takes place quickly enough for the panes placed on this additional mold to be bent once again under the effect of the force of gravity. In this instance they already, in each case, approach the final mold at their edges. This has the advantage that after the concave solid mold has been transferred (and possibly after the upper mold has been set in place), the suction molding of the pane or panes can be begun immediately and that there is no longer any need to wait for the pane to adapt to the solid mold along its edges, and that if necessary the use of an upper mold can be dispensed with entirely. Possible marginal slots between the face of the panes and the solid mold are limited to a minimum if the edges of the panes have practically already been marked with their final contour.

The shape and the support faces of the two bending frames are also adapted to one another in such a way that the two support faces touch the surface of the pane only as close as possible to its edge, preferably over a narrow band a maximum of 10 mm wide, possibly even of a width of just 6 to 7 mm. This is possible according to an advantageous improvement when the two bending frames or their support faces cover each other in vertical projection (the "shrinkage" of the panes which is visible at the edges being adjusted correspondingly with an increasing depth of curvature that also has to be taken into consideration), but which nonetheless lie at different heightwise positions. One particular advantage of this embodiment of the two bending frames is that the marks or markings inevitably left by the support faces on the surface of the pane in contact are located only along their outermost marginal zones. Thus, an additional optical improvement is obtained over the known two-ring bending methods.

BRIEF DESCRIPTION OF THE DRAWINGS

Other details and advantages of the subject of the invention will be provided by the illustrated depiction of various steps, or phases, in the performing of the method or in the steps of bending in a corresponding device, and by its detailed description which follows hereinbelow.

In a simplified contour depiction:

FIG. 1 illustrates the prebending operation;

FIG. 2 shows the transfer of the pair of panes onto the concave solid suction bending mold;

FIG. 3 depicts the sealing of the edge of the pair of panes using an upper mold;

FIG. 4 shows the start of the exposure to the depression;

FIG. 5 illustrates the removal of the upper mold, with the exposure to the depression at the same time maintained through the suction bending mold; and FIG. 6 shows the transfer of the finished bent pair of panes onto a transport device;

DETAILED DESCRIPTION OF THE PREFERRED EMBODIMENTS

Figure 7:
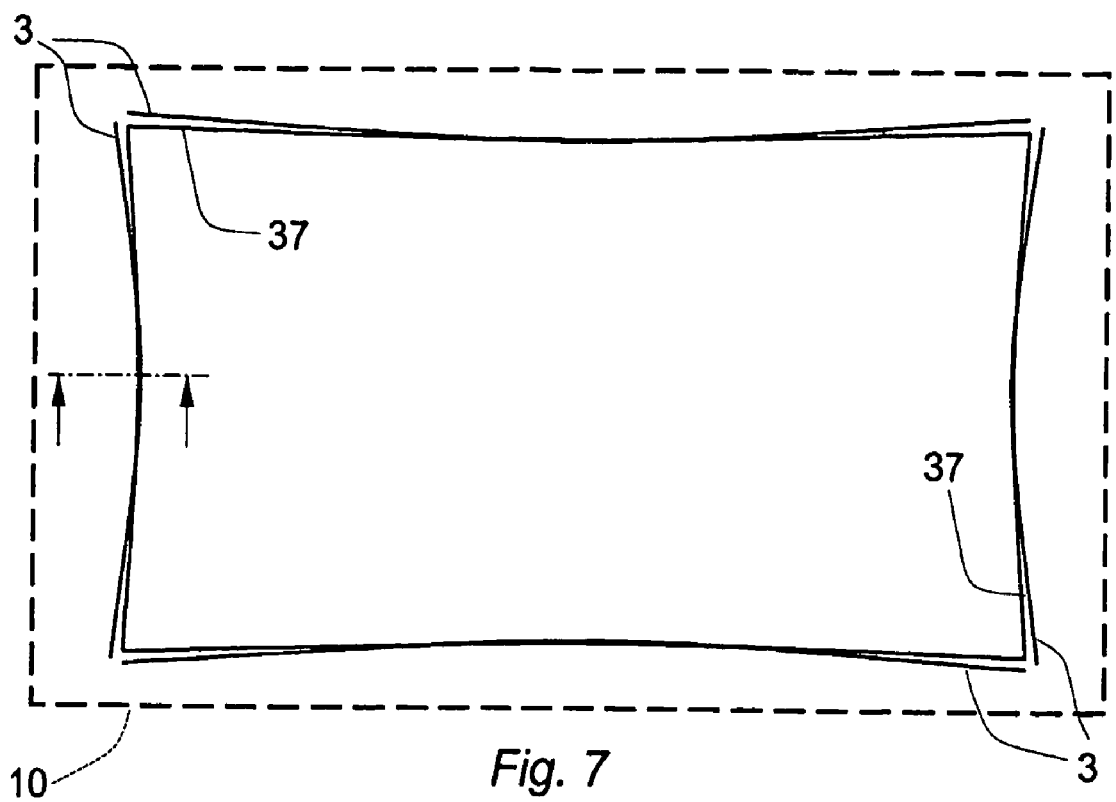
FIG. 7 shows a vertical elevation of a unit of two bending molds in the form of different frames.

FIG. 1 shows, inside a bending station simply marked as 1, a pair of panes 2 which has been deposited on a prebending mold 3 in the form of a frame. In general, this prebending mold may already be used for transporting panes deposited during the heating of the panes to their softening temperature in a furnace, not depicted, which may be part of the device. Transfer is, however, also possible in some other way, using other means known per se. The treatment of bending, in pairs, the two panes always starts with the common prebending step, which is carried out under the action of the force of gravity on the prebending mold 3. This prebending has already been carried out in the phase illustrated in FIG. 1.

Over the prebending mold 3 there is a convex upper mold 4 which also has the shape of a frame. The contour of its forming face is a little smaller than the contour delimited by the prebending mold. The function of the upper mold 4 will be explained further later on. Under certain conditions, which will also be discussed further later on, the upper mold 4 does not, however, necessarily have to be used for the method described here.

Under the prebending mold 3 is a concave suction bending mold 5 with a suction duct 6. The forming contour of the upper mold 4 complements the forming face of the suction bending mold 5. In the embodiment illustrated here, the latter is able to move heightwise in the direction of the force of gravity by means of an operating device, not depicted. Its perimeter is configured so that, as it is being raised, it can be passed through the space delimited by the prebending mold with a small gap around all the sides and so that it can receive the pair of panes 2 on its forming face. The forming face of the suction bending mold 5 may be set back slightly from the outer edge of the panes.

Naturally, the transfer operation could just as easily be represented the other way round, lowering the prebending mold 3 toward and respectively onto the suction bending mold 5 so that the suction bending mold 5 is lowered into the other mold. If necessary, segments of a split prebending mold are parted for this transfer operation.

It goes without saying that all the forming faces which come into contact with the glass are, in the usual way, covered with a heat-resistant meshed or smooth background fabric which further reduces the risk of damage due to mechanical contact.

The move on from the prebending step to the main bending step in the bending operation is shown in FIG. 2. The edge of the lowermost pane is already resting on the peripheral edge of the raised suction bending mold 5, but protrudes slightly beyond the perimeter of the suction bending mold 5. The upper pane of the prebent pair of panes 2 has not yet the slightest contact with the bending molds.

It is sometimes necessary to produce large radii of curvature and, respectively, small tangential angles (these are the angles between the initial plane of the flat non-deformed pane and the tangent to the respective edge regions of the finished bent pane) in the region of the edge of the panes. Now, the action of the force of gravity may already in itself cause good adaptation of the edge of the pane to the peripheral edge of the bending face when the simply slightly prebent panes are set down on the suction bending mold. In consequence, the gap left between the underside of the lowermost pane and the bending face is then already practically sealed against the outside. Even between the edges of the two panes, the worst that happens is that negligible air slots are formed. The depression can now be applied to the suction bending mold to press the two panes of the pair of panes 2 at the same time against the bending face. There would be no need to use the upper mold 4.

The latter is, however, used—as shown in FIG. 3 in a later phase—when, as a result of a complex bending shape of the finished panes (small radii, or large tangential angles at the edge) adaptation of the underside of the panes to the peripheral edge of the suction bending mold 5 cannot be obtained simply under the force of gravity during the transfer operation. Here, the suction bending mold 5 is once again raised until the complementary forming face of the upper mold 4 comes into contact with the top face of the uppermost pane. Of course, the upper mold 4 could just as easily be lowered onto the suction bending mold 5. In both instances, the pair of panes 2 is pressed by the edges against the forming face of the suction bending mold.

If this seals this edge between the underside of the lowermost pane and the peripheral edge of the bending face, on the one hand, and between the edges of the two panes, on the other hand, then the connection between the depression generator, not depicted, and the suction bending mold 5 is opened, according to FIG. 4. The suction air flow which now occurs is indicated by an arrow pointing downstream in the suction duct 6 of the suction bending mold 5. The atmospheric pressure above the pair of panes 2, and the pressure difference created on the pair of panes 2 now presses the two panes at the same time against the bending face. These panes simultaneously acquire a highly complementary definitive spatial form. Any traces of the mechanical action of the upper mold 4 on the top face of the uppermost pane remain very locally restricted to the outside edge region thereof.

After a short predetermined length of time, the contact between the top face of the uppermost pane and the upper mold 4 is once again broken as shown in FIG. 5. The suction bending mold 5 is once again lowered, keeping the depression applied (or, as appropriate, the upper mold 4 is raised again). Nevertheless, the pressure difference across the pair of panes 2 (arrow pointing downstream in the suction duct 6) is still maintained for a period of time that is dependent upon the complexity of the finished bending contour of the pair of panes 2. This then makes sure that contact across the entire surface can still be established between the underside of the lowermost pane and the concave bending face of the suction bending mold 5 even after the upper mold has been removed.

When, as was mentioned earlier, the use of the upper mold 4 during the main bending step is dispensed with, it is possible to move on directly from the transfer phase illustrated in FIG. 2 to the phase illustrated in FIG. 5 of limited application, over time, of a depression to the freely placed pair of panes. The steps in FIGS. 3 and 4 could then be omitted.

As the last phase in the bending method proper, the application of the depression is interrupted after the length of time provided for this. The now finished bent pair of panes 2 first of all rest freely in surface contact with the suction bending mold 5. As shown in FIG. 6, it may be transferred from that mold onto a transport device 7 which is brought in here in place of the prebending mold 3 used previously. The transport device 7 once again has the form of a frame, in a way known per se. In the optimum case, its surface forms a continuous extension of the bending face of the suction bending mold 5. The free face which it delimits is therefore once again at least as large as the suction bending mold. During transfer of the finished, but nonetheless still hot, bent pair of panes 2 (which transfer here is performed by lowering the suction bending mold 5 through the transport device), further unintended deformation of the edge is prevented. Placed on the transport device 7, the pair of panes 2 is now conveyed to a cooling station, not depicted, as shown by an arrow pointing to the right.

FIG. 7 illustrates an alternative form of the device described hitherto. In addition to the prebending mold 3 in the form of a frame, there is now an additional bending frame 37. The two bending molds 3 and 37 in the form of frames form a mechanically coupled unit (indicated by a box 10) which is also used for transporting panes during the bending treatment and, as necessary, during heating and cooling.

In the vertical elevation that is FIG. 7, it can be seen that the support faces (of spherical curvature) of the prebending mold 3 in vertical projection with those of the bending mold 37 overlap in other parts and can be projected one beside the other only in the four corner regions. In this example, the contour of the bending mold 37 in the corner regions, by comparison with the contour of the prebending mold 3, is markedly higher than in the lateral regions, because the panes are generally bent quite spherically in such molds (particularly in the case of vehicle windshields). Furthermore, the greatest visible shrinkages of the panes fit precisely into the corners, when the depth of the curvature increases. Even more pronounced sinking is obtained on the bending frame 37 under the effect of the force of gravity.

The prebending mold 3 is here split into four segments, one for each edge of the pane. For reasons of clarity only, relatively large spaces which separate these segments from one another have been left in the corner regions of this mold.

This is neither, however, the only way nor the only position in which to arrange the separations of the segments.

In fact, this segmentation of the prebending mold 3 serves to transfer the prebent pair of panes from the prebending mold 3 onto the prebending frame 37 which is rigid per se. The latter lies under the prebending mold while it is still carrying the panes (in its "active" position). Through a disengagement operation known per se, the segments of the prebending mold 3 are pivoted or tilted sideways downward ("passive" position). The underside of the supported pane is then first of all brought into contact with the relatively tall corner regions of the bending frame 37. Thereafter, the pair of panes (still heated to the softening temperature) sinks down further under the effect of the force of gravity, the glass underside resting along its edges and, to a large extent, against the support faces of the bending frame 37. At least at these edges, the pair of panes 2 thus essentially has its final bent contour. This operation represents an intermediate step, which, temporarily, lies between the states illustrated in FIGS. 1 and 2. However, essentially the same regions of the faces of the glass come into contact with the bending frame 37 as those which were resting before against the prebending mold 3.

It is possible to provide horizontally-running spindles for moving the segments of the prebending mold 3, these spindles having to be placed on the box 10 in an appropriate way known per se. The movement is furthermore preferably configured in such a way that the relative sliding movement of the support faces of the prebending mold 3 and of the surface of the glass resting on it is as small as possible.

Figure 7A:
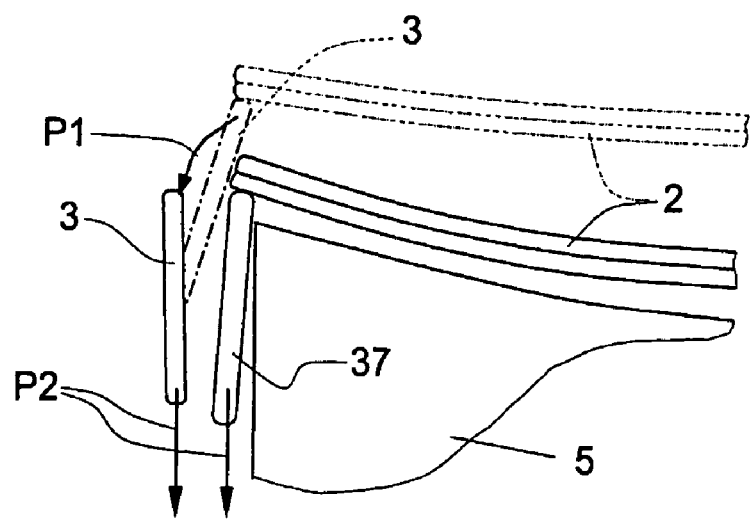
FIG. 7a illustrates a detail of FIG. 7 in the viewing region indicated by arrows, with a section of a concave suction bending mold and of a pair of prebent panes.

The direction in which the sectional depiction of FIG. 7a is viewed is indicated in FIG. 7 with a dotted line and with two upwardly pointing arrows. This explains the procedure already mentioned hereinabove more clearly.

The prebending mold 3 or its support face lies in the sectioned region of the individual segment visible here initially higher up (illustrated in dotted line) than the bending frame 37, but nonetheless covers the latter in its vertical projection. Also in dotted lines is shown the bending contour, depicted only relatively slightly prebent, of the pair of panes 2 in the support region. It should be pointed out that, in this schematic depiction, the true bendings of the panes can at best be illustrated approximately.

A curved arrow P1, pointing downward, indicates a pivoting movement by means of which the segment concerned of the prebending mold 3 (at the same time as all the other segments) is placed in a "passive" position. The pair of panes 2 is on the bending frame 37 and has already sunk to a bending contour approximately corresponding to its final spatial shape after the bending treatment.

Two parallel arrows P2 pointing downward indicate the operation of transfer to the concave suction bending mold 5 as is also indicated in FIG. 2. Here too it can be seen that the support face of the bending frame 37 meets the forming face of the suction bending mold with as little joint as possible.

The bending frame 37 also comes into the place of the transport device 7 also illustrated in FIGS. 5 and 6. Next, the bent finished panes on the suction bending mold 5 can once again be transferred, once the depression ceases, onto the bending frame 37 and be conveyed thereon to their cooling station. Naturally, the prebending mold 3 or its segments have first of all to be returned to their active position (indicated in dotted line in FIG. 7a) before a further pair of panes is loaded.

Another great advantage of the configuration described here lies in the fact that the necessary protrusion of the panes 2 beyond the forming face of the suction bending mold 5 can be restricted to a minimum dimension, so that the irregularities perceivable to the naked eye can also be minimized here.

Moving away from the previous embodiments, it would be possible to conceive of splitting the two support faces of the bending frames 3 and 37 nested one inside the other into several small support faces or support points offset from one another, so that both could sit completely one inside the other in the manner of a comb. Thus, each relative sliding movement of the support faces of the mold and of the surface of the glass could be avoided. The two bending frames no longer have to be adjusted with respect to each other except in terms of height.

The invention claimed is:

1. A method for bending, in pairs, panes placed one upon another, heated to their softening temperature, comprising:
   depositing the pair of panes on a first bending frame and prebending the pair of panes under action of force of gravity;
   transferring the prebent pair of panes directly from the bending frame onto a suction bending mold with a concave forming face, an underside of a lowermost pane being supported at least on a peripheral edge of the forming face of the suction bending mold;
   depressing in the pair of panes for a predetermined length of time by sucking air out of an intermediate space between the underside of the lowermost pane and the suction bending mold, and
   pressing the pair of panes under atmospheric pressure onto the concave forming face of the suction bending mold;
   transferring, after an end of application of the depression, the molded pair of panes from the suction bending mold directly onto a frame with a contour is flush against the forming face of the suction bending mold and cooling the transferred molded pair of panes.

2. The method as claimed in claim 1, further comprising:
   transferring the prebent pair of panes from the first bending frame onto a second bending frame with a contour corresponding to a final bent contour at edges of the panes and after another bending operation under effect of force of gravity; and
   transferring the pair of panes from the second bending frame to the concave suction bending mold.

3. The method as claimed in claim 2, wherein the pair of panes is dropped onto the second bending frame by pivoting the first bending frame which is split into segments.

4. The method as claimed in claim 2, wherein a surface of the pair of panes is brought into contact with supporting faces of the first bending frame, and of the second bending frame, essentially along same peripheral lines.

5. The method as claimed in claim 1, wherein an edge of the pair of panes which pair is transferred onto the suction bending mold is, before the depression starts to be applied, pressed at least temporarily onto an edge of the suction bending mold by an upper mold that complements the suction bending mold.

6. The method as claimed in claim 5, wherein contact between an upper face of an upper pane and the upper mold is broken before an end of application of the depression and application of the depression is maintained for a predetermined length of time.

7. The method as claimed in claim 1, wherein the first bending frame has a larger perimeter than the suction bending mold and is lowered toward the suction bending mold, the underside of the lowermost pane thus being brought into contact with the suction bending mold.

8. The method as claimed in claim 1, wherein the suction bending mold is guided upward through the first bending frame produced with a larger perimeter and is brought into contact with the underside of the lowermost pane.

9. A device for bending, in pairs, panes placed one upon the other and heated to their softening temperature in a furnace, comprising:
- at least one prebending mold in a form of a frame configured to carry a heated pair of panes to a softening temperature thereof;
- a suction bending mold having a concave forming face and a peripheral edge, said concave forming face being set back slightly with respect to a face of a lowermost pane onto which the prebent pair of panes is transferred and deposited, the at least one prebending mold surrounding the suction bending mold when the pair of panes is being transferred;
- means for producing a depression in the pair of panes which is limited over time between the concave forming face and an underside of the lowermost pane of the pair of panes, by which depression a pressure difference is created across the prebent pair of panes positioned on the peripheral edge of said suction bending mold, and this pair of panes is pressed against the forming face; and
- an upper mold that complements a forming face of the suction bending mold, configured to be brought into contact at least with an edge of an uppermost pane of the pair of panes before the depression is applied to the suction bending mold, and
- a transport device configured to transfer the bent pair of panes to a cooling station, from the suction bending mold.

10. The device as claimed in claim 9, wherein the at least one prebending mold is combined with an additional bending mold in a form of a frame, the at least one prebending mold being movable with respect to the additional bending mold so that the prebent pair of panes can be transferred from the at least one prebending mold to the additional bending mold.

11. The device as claimed in claim 10, wherein support faces of the at least one prebending mold are higher in an active position carrying the pair of panes than support faces of the additional bending mold.

12. The device as claimed in claim 10, wherein support faces of the at least one prebending mold, in an active position carrying the pair of panes, cover at least partially support faces of the additional bending mold in vertical projection.

13. The device as claimed in claim 10, wherein the two bending molds in the form of frames come into contact with a surface of the pair of panes one after the other only over a narrow marginal strip at most 10 mm wide, measured from an edge of the pair of panes.

14. The device as claimed in claim 10, wherein the at least one prebending mold or its support faces are split into plural segments each of which is movable, with respect to the additional bending mold in the form of a frame while the pair of panes is being transferred.

15. The device as claimed in claim 10, wherein the at least one prebending mold and the additional bending mold in the form of a frame are arranged on a common fixture or frame and can be moved jointly with a view to transporting the pair of panes.

16. A device for bending, in pairs, panes placed one upon the other and heated to their softening temperature, comprising:
- a furnace for heating the panes,
- at least one prebending mold in the form of a frame configured to carry a heated pair of panes to a softening temperature,
- a suction bending mold having a concave forming face, which is set back slightly with respect to the face of the lowermost pane, onto which the prebent pair of panes is transferred and deposited, the prebending mold surrounding, in the form of a frame, the suction bending mold when the pair of panes is being transferred,
- means for producing a depression which is limited over time between the concave forming face and the underside of the lowermost pane, by which depression a pressure difference is created across the prebent pair of panes, and said pair is pressed against the forming face,
- an upper mold that complements the forming face of the suction bending mold, which is brought into contact at least with the edge of the uppermost pane of the pair of panes before the depression is applied to the suction bending mold, and
- a transport device for transferring the finished bent pair of panes to a cooling station, to which said bent pair of panes is transferred from the suction bending mold.

* * * * *